Jan. 9, 1962     O. MUELLER     3,015,970
FLUID LOCK FOR DIFFERENTIAL
Filed Nov. 6, 1958     6 Sheets-Sheet 1

INVENTOR.
Otto Mueller.
BY
Harness, Dickey & Pierce.
ATTORNEYS.

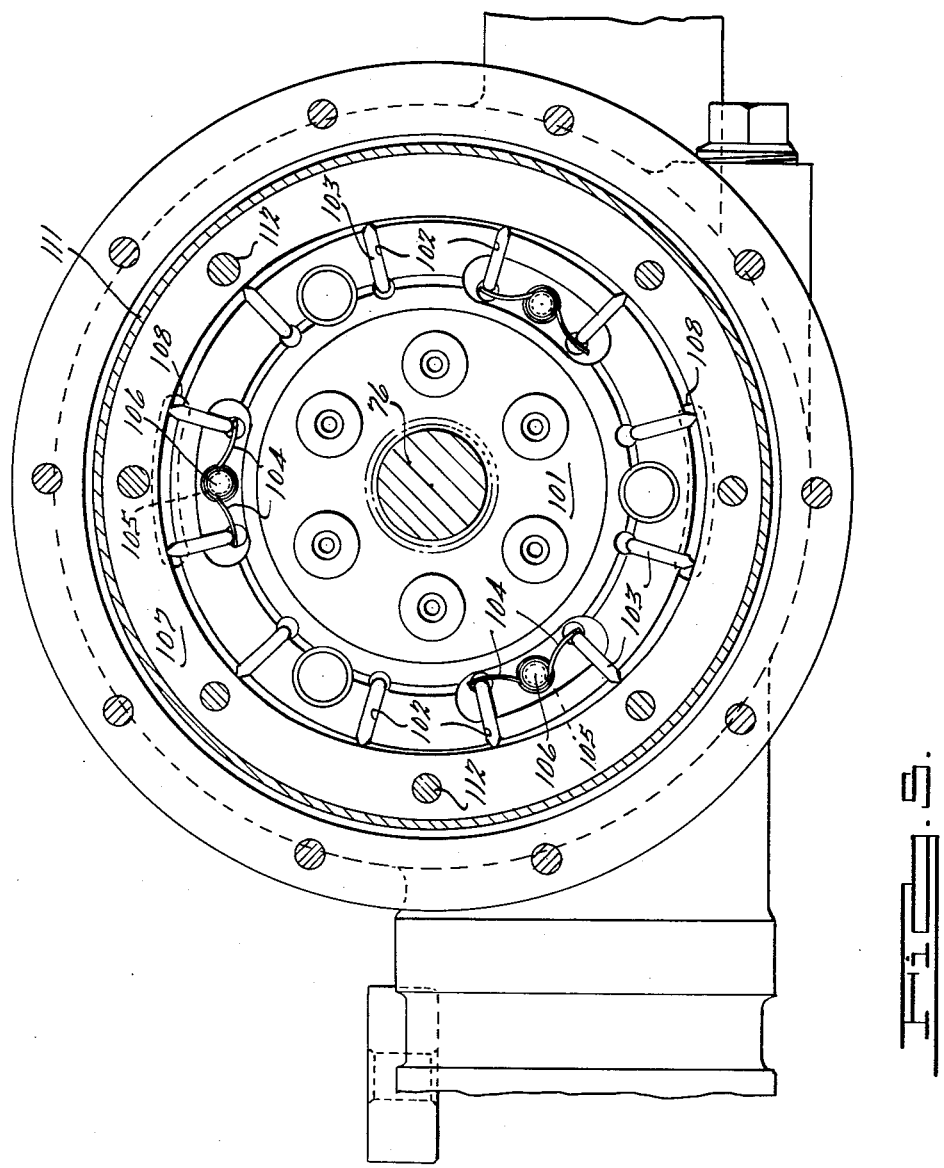

Jan. 9, 1962   O. MUELLER   3,015,970
FLUID LOCK FOR DIFFERENTIAL
Filed Nov. 6, 1958   6 Sheets-Sheet 6
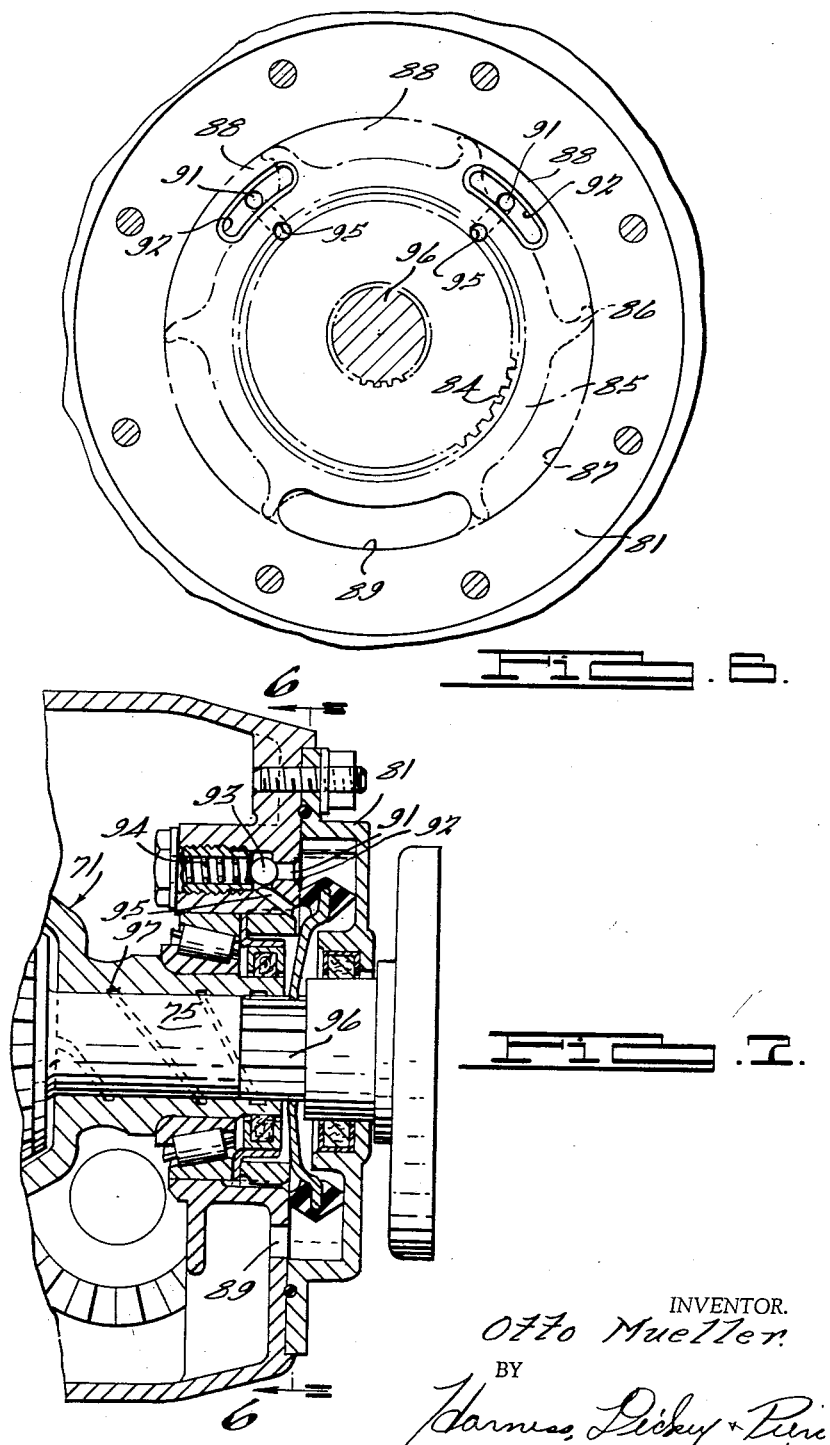
INVENTOR.
Otto Mueller
BY
Harness, Dickey & Pierce
ATTORNEYS.

United States Patent Office 3,015,970
Patented Jan. 9, 1962

3,015,970
FLUID LOCK FOR DIFFERENTIAL
Otto Mueller, 13 Byfield Lane, Dearborn, Mich.
Filed Nov. 6, 1958, Ser. No. 772,220
5 Claims. (Cl. 74—711)

This invention relates to locks for differential drives of automotive vehicles, and particularly to a fluid lock and means to provide a positive supply of fluid thereto.

Automotive vehicles are driven through differentials which permit one driven wheel to operate at a faster rate of rotation than the other without strain when going around a curve or when traction is reduced on one wheel. Difficulty is experienced with such differentials when operating on slippery pavement, one having a surface of ice, mud, gravel or the like, when one wheel loses all of its traction and spins, causing the vehicle operation to become hazardous. Attempts have been made for many years to produce a satisfactory lock for the differential which will permit differential change in speeds on the driving wheels when turning at corners but which will produce a lock to prevent one wheel from spinning relative to the other when it loses traction with the road surface.

In the application of Otto Mueller, Serial No. 547,929, filed November 21, 1955, now Patent No. 2,861,477, a fluid lock for a differential is illustrated having incorporated therein a means for delivering fluid from the differential housing into the case, providing a supply to the fluid lock which secures the differential against relative movement when excess slippage occurs between the wheels. This differential lock was constructed to fit within the standard housing of the automobile for which it was designed. The present invention embodies a similar arrangement of differential locking parts constructed for a differential for a housing which has been slightly widened to provide space for two pumps, one for delivering fluid to the case and the other forming the locking element of the differential.

Accordingly, the main objects of the invention are: to provide a differential with a pair of pumps, one for positively delivering fluid to the interior of the case, the other for locking the differential when a pumping action occurs due to the excess differential operation when one of the wheels spins; to provide a differential which employs the fluid within the housing for locking relatively movable pump parts and positively driving both driven wheels without overstraining the driven parts; to maintain a constant supply of fluid within a differential case for a pump having relatively movable parts connected to a side gear and to the case which become locked when relatively moved for locking the differential and producing a drive to both of the driven wheels, and, in general, to provide a lock of the fluid type for the differential of an automotive vehicle which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein:

FIG. 5 is a sectional view of the structure illustrated in FIG. 4, taken on the line 5—5 thereof;

FIG. 6 is a sectional view of the structure illustrated in FIG. 7, taken on the line 6—6 thereof, and FIG. 7 is a broken sectional view of the structure illustrated in FIG. 5, taken on the line 7—7 thereof.

Figure 1:
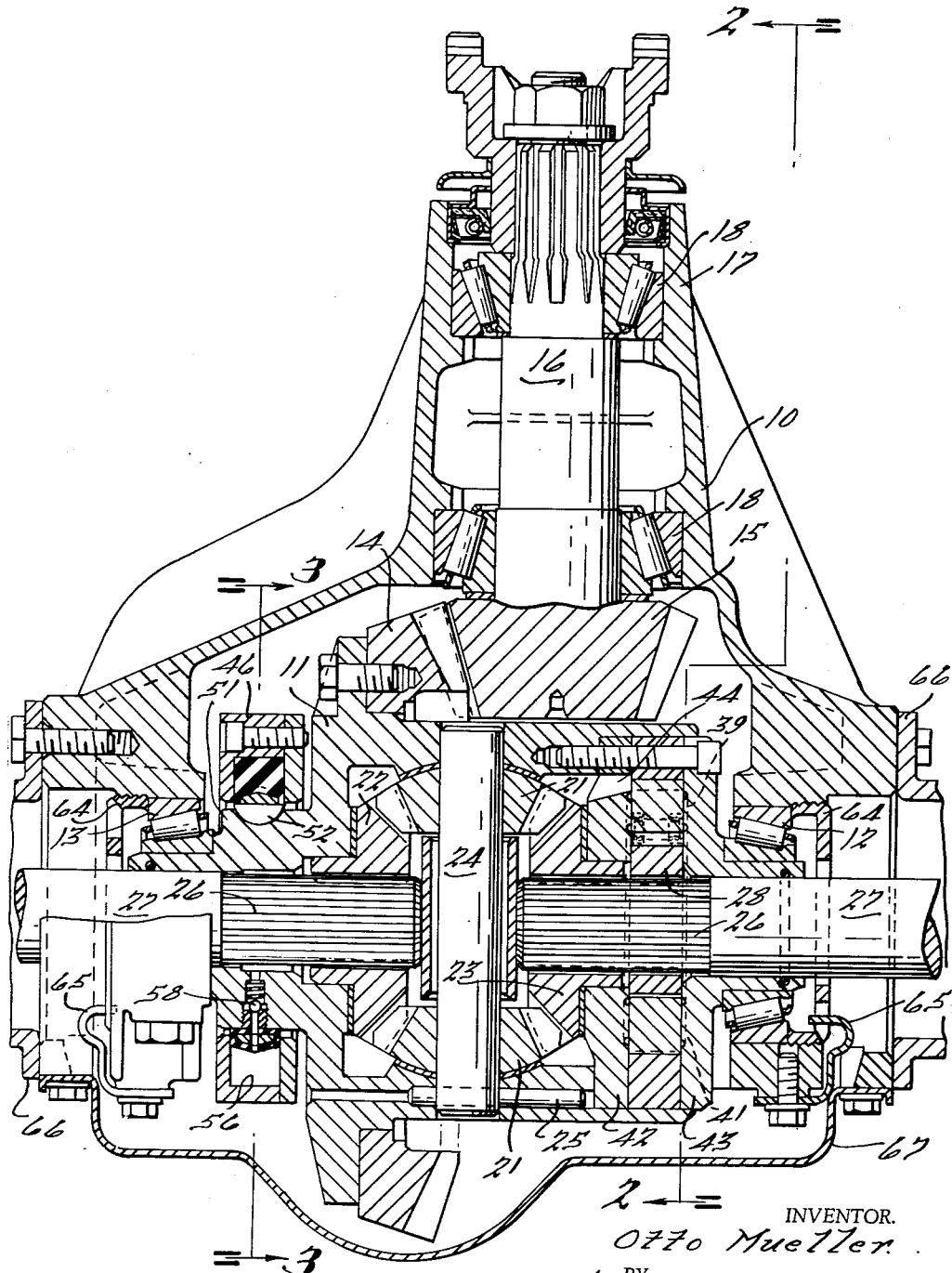
FIGURE 1 is a broken sectional view of a differential for an automotive vehicle embodying features of the present invention.
Figure 2:
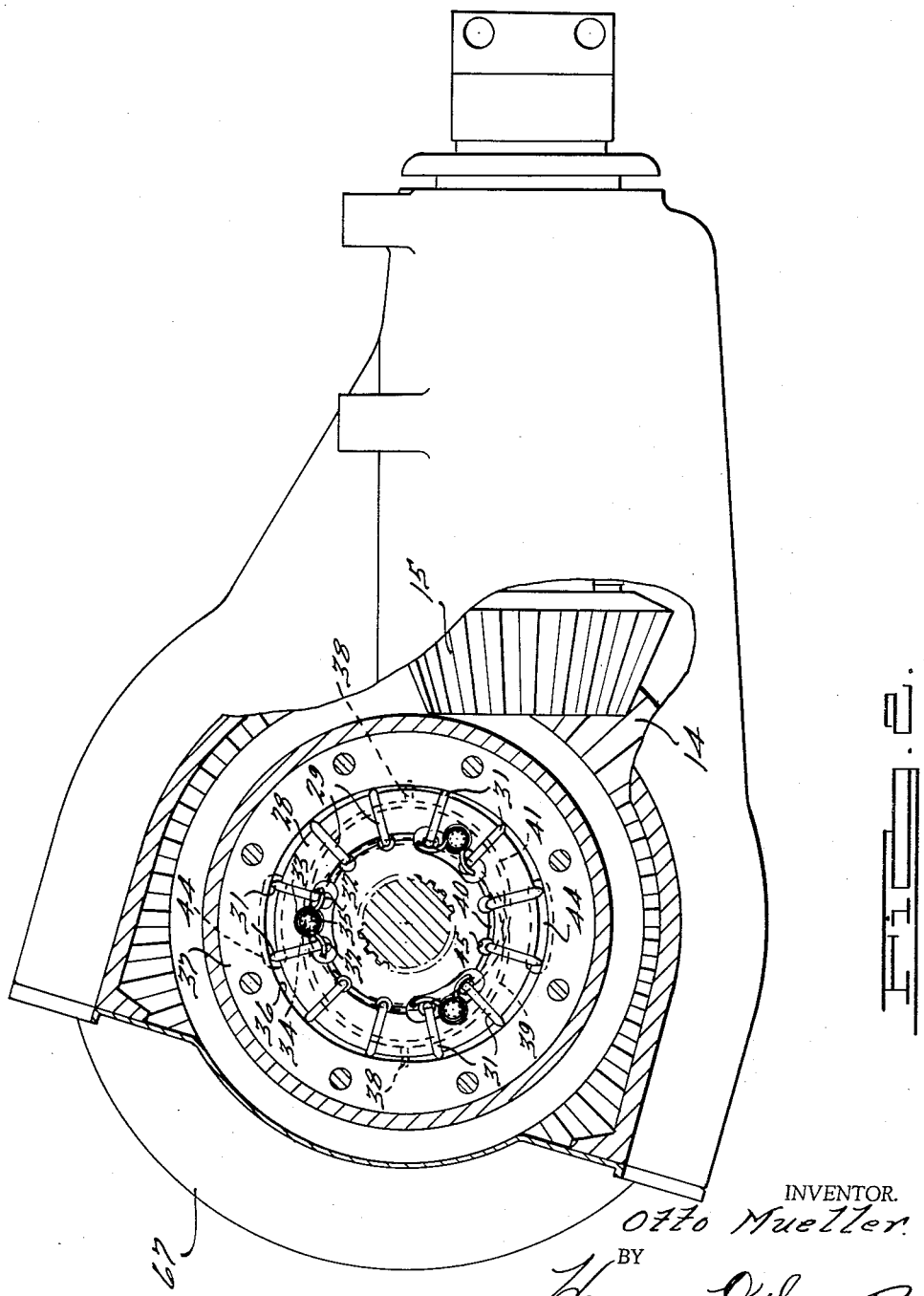
FIG. 2 is a sectional view of the structure illustrated in FIG. 1, taken on the line 2—2 thereof.
Figure 3:
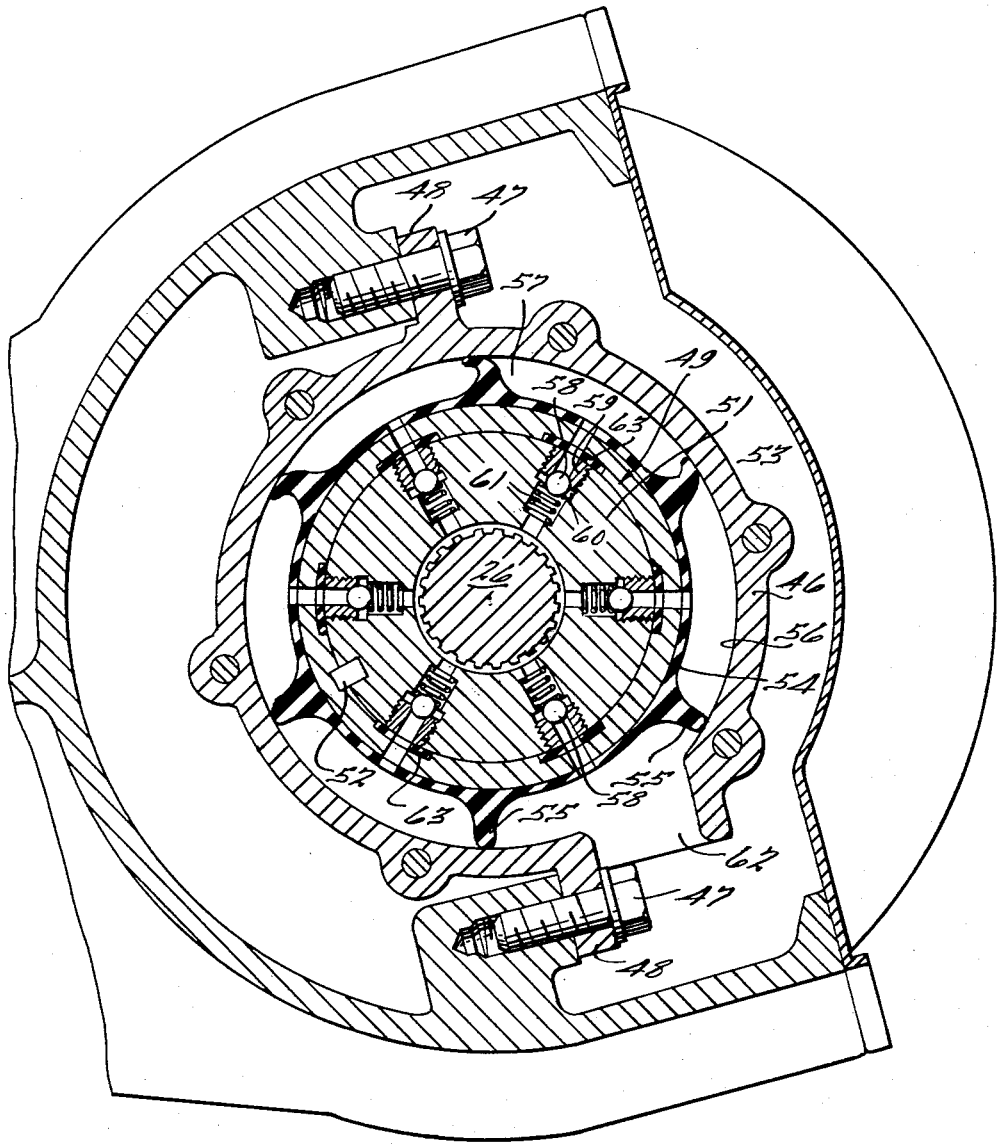
FIG. 3 is a sectional view of the structure illustrated in FIG. 1, taken on the line 3—3 thereof.

Referring to FIGS. 1, 2 and 3, a differential housing 10 is illustrated supporting a case 11 on a pair of like bearings 12 and 13. The case supports a ring gear 14 which is driven by a pinion 15 from a stub shaft 16 which is mounted on a sleeve end 17 of the housing by a pair of bearings 18 in a conventional manner. The case supports a set of pinion gears 21 having teeth which mate with teeth of side gears 22 and 23 which are of conventional construction. The pinions 21 are supported on a shaft 24 which extends through apertures in the case and which is locked in position by a pin 25. The side gears 22 and 23 are splined to receive a splined end 26 of the wheel driving axles 27. The case 11 is sealed to the axles 27 so as to maintain pressure on the fluid delivered therewithin. The spline 26 on the axle 27 engaged with the side gear 23 has a spline engagement with a pump rotor 28 containing radial slots in which vanes 29 are disposed for radial movement. A number of pairs of the vanes 31 are biased outwardly by spring arms 32 which extend from a central coil 33 disposed about a pin 34 below the head 35 thereof. By biasing certain of the pairs of the vanes outwardly to initially provide a seal with the inner surface 36 of a compression ring 37, the time required to centrifugally move the blades outwardly to produce the seal is eliminated and an instantaneous pumping action occurs. All of the blades may be biased in this manner but it was found that it is only necessary to have some of the blades so biased to produce pressure and the instantaneous pumping action when wheel slippage occurs. Fluid is immediately supplied to the rear of the blades which are forced outwardly to engage the surface 36 of the compression ring 37. The ring has two oppositely disposed compression areas which produce a balanced type of pump and two areas of resistance.

The fluid is supplied through a passageway 38 to the overlapping nonconcentric annular passageways 39 and 41 on the face of a plate 42 and the end plate 43 disposed on opposite sides of the rotor 28 and the compression ring 37. The fluid is delivered to a passageway 40 connected to apertures 45 at the base of the blades 29 which are urged outwardly thereby as soon as a pumping action occurs. The plate 42 has an inlet port 44 from which fluid within the case is delivered to the space between the rotor 28 and the compression ring 37 at diametrical points in the noncompressive area thereof.

The left-hand end of the case 11 has a pump housing 46 containing lugs 48 which are secured to the differential housing by screws 47, as clearly illustrated in FIG. 3. An impeller 49 is secured to a hub section 51 of the case by a key 52. The impeller comprises a metal ring 53 having a flexible ring 54 secured on the outer surface which is provided with vanes 55 which engage the inner surface 56 of the pump housing 46. The annular surface 56 is located in off-center relation to the center of the hub section 51 so that the vanes 55 will be deflected, as illustrated in the top part of the pump in FIG. 3, to produce the compression of the fluid in the area 57 between the vanes. The pressurized fluid will unseat a ball 58 which is normally urged by a spring 61 into sealing engagement with a seat of a sleeve 59 threaded in an aperture 60 communicating with each area 57. The fluid is delivered from the apertures 60 to the area between the adjacent axle 27 and the hub section 51 of the case from which it is free to flow to the center of the case to thereby maintain the interior of the case full of differential fluid at all times irrespective of the viscosity thereof. The bottom of the case has an intake opening 62 which is substantially below the surface of the fluid within the differential housing. The inner surface of the ring 53 has resilient sealing elements 63 about the apertures 60 to produce a seal therewith and with the hub section 51. The fluid within the sealed differential case 11 provides the additional advantage of lubricating the teeth of the pinions, the side gears and the relatively movable surfaces therewithin. The provision of the threaded end caps 64, the locking fingers 65 thereof, the enclosing housing 66 at the end of the differential housing, as well as the removable closure stamping 67 for the rear portion thereof, are all of conventional design and will not be described further herein.

In FIGS. 4 to 7, the invention is illustrated as being applied to a truck differential of the single or multiple drive type. A case 71 contains the pinion gears 72 and the side gears 73 and 74. The side gears have stub shafts 75 and 76 extending therefrom. The case is journaled in the differential housing 77 on bearings 78 sealed by the sealing elements 79. A pump casing 81 is sealed to the differential housing 77 when secured thereto by studs 82, a spider 83 being splined to the splines 96 on the end of a shaft 75 to be driven therewith. The spider has an annular body 85 made of flexible material secured to the periphery thereof with vanes 86 extending outwardly therefrom. The vanes engage a cylindrical surface 87 in the casing 81, the center of which is offset from the center of the spider 83 so that compression occurs in the area 88 at the upper portion of the pump, as illustrated in FIG. 6. Fluid enters the pumping area through an aperture 89 at the bottom portion of the casing 81, as illustrated in FIGS. 6 and 7, and when moved to the top of the pumping area by either a clockwise or counter-clockwise movement of the body 85, the fluid will be delivered into the exhaust ports 91 through the elongated aperture 92 in communication therewith, depending upon the direction of rotation. In FIG. 6 the rotation is illustrated as being clockwise, with the vanes folded counter-clockwise and the fluid delivered from the exhaust port 91. As illustrated in FIG. 7, the exhaust port is sealed off by a ball 93 which is urged on its seat by a spring 94 of predetermined tension. When the pressure is sufficient, the ball is unseated and the fluid is delivered past the ball through a passageway 95 into the area about the spline 96 of the shaft 75 from which it is free to flow through a spiral passageway 97 to the interior of the case 71 to maintain it full of the differential fluid at all times.

Figure 4:
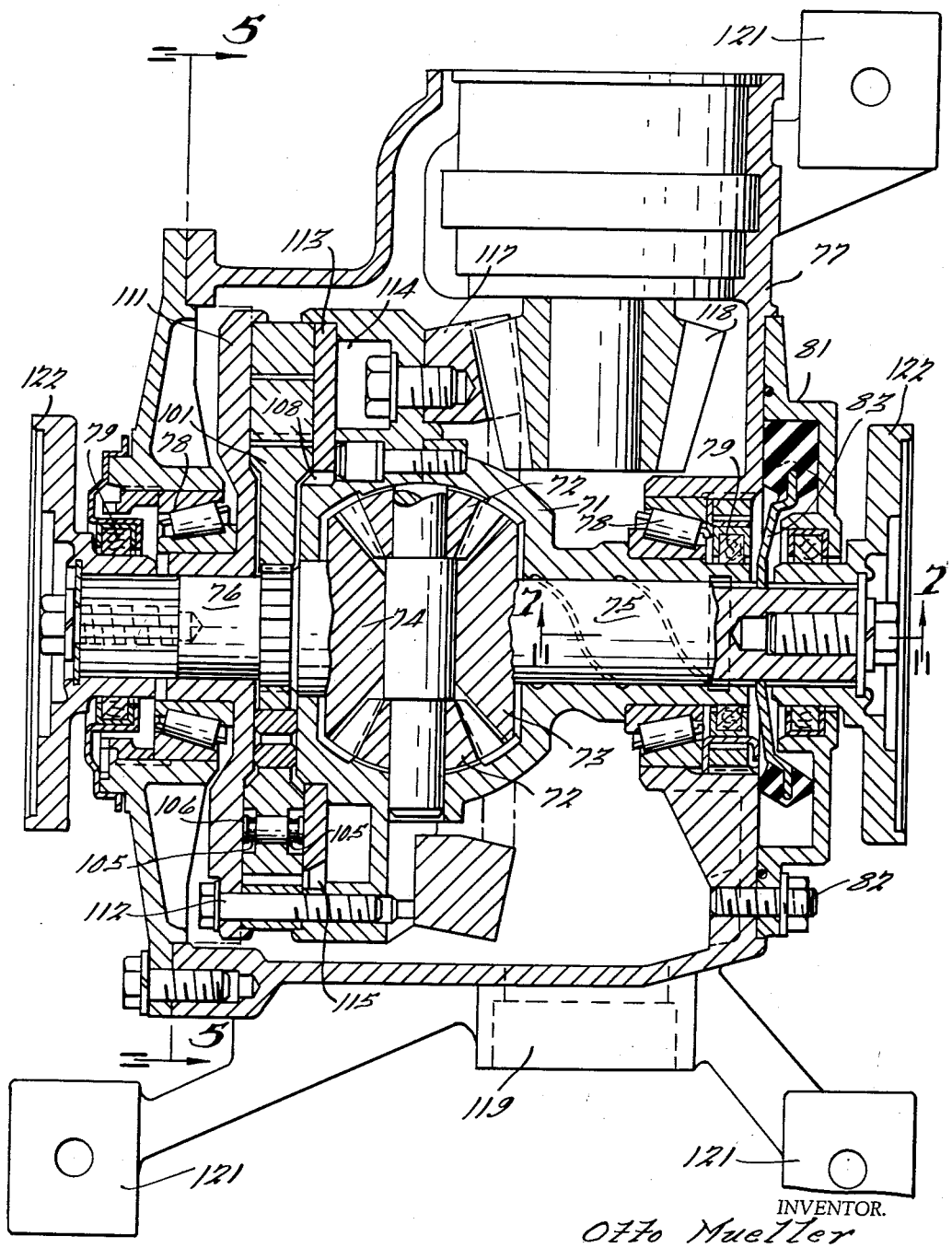
FIG. 4 is a sectional view of structure, similar to that illustrated in FIG. 1, showing another form of the invention.

The shaft 76 has a rotor 101 of a fluid clutch in the nature of a pump splined thereto containing a plurality of radial slots 102 in which radially movable vanes 103 are mounted. Certain pairs of vanes are biased outwardly by spring arms 104 extending from a coil 105 about headed pins 106. Vanes engage the inner surface of a compression ring 107 and an intake of fluid occurs through the inlet ports 108 in the opposite noncompressive areas between the rotor and ring. The outer or left-hand face of the compression ring and rotor, as viewed in FIG. 4, is enclosed by a plate 111 which is secured to the case by a plurality of screws 112. The opposite side of the ring and rotor is engaged by a plate 113 the opposite face of which communicates with an annular reservoir 114 into which the fluid pressurized by the vanes 86 is delivered. The fluid in the reservoir 114 is available at all times for delivery to the space between the rotor and reactor ring through the ports 115.

The case is driven by a ring gear 117 from a bevel gear 118 which in some instances could have a shaft extending from the end thereof out through the aperture 119 of the case to drive a second differential in extension of the one illustrated. The housing for the differential is secured in position by the feet 121 to the chassis frame of the truck. Axles are driven by the shafts 75 and 76 which are attached to the plates 122 provided at the ends thereof in the usual manner.

In either of the constructions, a positive supply of differential fluid is maintained within the case by a supply pump so as to be available for lubricating the moving surfaces within the case and for supplying the locking clutch in the nature of a pump should a relative movement occur between the rotor and the reactor ring thereof due to the difference in the speed of rotation between the driven wheels. It is to be understood that either fluid supplying or the locking pump or clutch structure may be changed to other types which are known to be suitable. The normal "around-the-corner" differential action is permitted when only a small difference in the speed of rotation occurs between the two driven wheels through the slow relative rotation of the locking pump or clutch parts and the leakage of the oil therefrom. When the relative rotation between the two driven wheels increases to a substantial amount, the fast relative rotation of the locking pump or clutch parts produces a pumping action on the fluid which is a lubricant, usually oil. There is no outlet from the locking pump so that pressure immediately builds up on the fluid which resists the pumping action. This resists the differential action between the axles and wheels, the difference in the speeds of which is producing the attempted pumping operation, resulting in the axles and driven wheels operating at substantially the same speed.

What is claimed is:

1. In a differential, a housing, a case within said housing having differential driving means therein, means for driving said case, a pair of axles extending from said case which may be relatively driven through said differential driving means, a positive displacement pump within the housing, means for driving said pump continuously when the axles are being driven to provide a continuous flow of differential fluid from the housing to the case which is maintained filled at all times during the rotation of said axles, a locking clutch in the nature of a pump connected to the case and one of said axles, and means employing the difference in the speed of rotation between said case and one of said axles for driving the second pump in rotation and producing a braking pressure to resist such rotation through the operation of the pump on the fluid drawn from said case.

2. In a differential, a housing, a case within said housing having differential driving means therein, means for driving said case, a pair of axles extending from said case which may be relatively driven through said differential driving means, a rotary pump within said housing, a locking clutch in the nature of a pump, means including the relative rotation between the case and housing for driving said first pump to provide a flow of fluid from the housing to said other pump at all times during the rotation of said axles, and means actuated by the difference in the speed of operation between the two axles to cause said other pump to rotate and operate on fluid from said first pump to resist said differential operation of the axles.

3. In a differential, a housing, a case within said housing having differential driving means therein, means for driving said case, a pair of axles extending from said case which may be relatively driven through said differential driving means, a pump having rotary drive means within in the housing, a locking clutch in the nature of a pump, means for driving said first pump continuously when the axles are rotated to provide a flow of fluid from the housing to the case where it is maintained available to the second pump, and means for driving said second pump when the axles are driven at different speeds for pumping fluid from said case and for building up a pressure within said second pump for resisting the driving of the axles at different speeds to cause them to operate at substantially the same speed.

4. In a differential, a housing, a case within said housing having differential driving means therein, means for driving said case, a pair of axles extending from said case which may be relatively driven through said differential driving means, a first pump having a fixed part secured to the housing and a movable part secured to the driven elements therewithin for moving fluid from the housing to within said case, a locking clutch in the nature of a pump having parts secured between said case and an axle to be driven at a rate corresponding to the difference in speed of operation of the axles for building up a pressure on the fluid withdrawn from the case whereby substantially low resistance to the operation of the axles occurs when a slow difference in speed occurs therebetween and which produces a substantial resistance to the driving of the axles at different speeds when the difference in speeds is substantial.

5. In a differential of the class herein described, a housing, a case within the housing, differential gears within the case, shafts extending from the case and driven by said differential gears, means for driving said case, a positive delivery rotary pump having a rotor and a housing containing an opening in the lower half for intake fluid, means securing said pump housing to said first housing, means for driving said rotor when said shafts are driven for supplying fluid directly through said opening from the bottom of the housing to within said case, said case being sealed sufficiently to be filled with the fluid delivered therewithin during the time the shafts are being driven, and a locking clutch in the nature of a second pump connected between the case and an axle to operate on the fluid from said case when said shafts are rotated at different speeds, the increased differential of which increases the resistance to the relative operation of said shafts.

References Cited in the file of this patent

UNITED STATES PATENTS

| | | |
|---|---|---|
| 2,092,698 | Hamblin | Sept. 7, 1937 |
| 2,122,284 | Heumader | June 28, 1938 |
| 2,148,352 | Hamblin | Feb. 21, 1939 |
| 2,397,374 | Schlicksupp | Mar. 26, 1946 |
| 2,409,995 | Morton | Oct. 22, 1946 |
| 2,627,190 | Bottcher | Feb. 3, 1953 |
| 2,655,055 | Bottcher | Feb. 3, 1953 |
| 2,660,279 | Knight | Nov. 24, 1953 |
| 2,734,398 | Bottcher | Feb. 14, 1956 |
| 2,808,739 | Mueller | Oct. 8, 1957 |
| 2,861,477 | Mueller | Nov. 25, 1958 |